United States Patent [19]

Elion

[11] Patent Number: 5,244,945
[45] Date of Patent: Sep. 14, 1993

[54] SYNTHESIS OF PLASTICS FROM RECYCLED PAPER AND SUGAR CANE

[75] Inventor: Glenn R. Elion, Chatham, Mass.

[73] Assignee: International Communications & Energy, Sausalito, Calif.

[21] Appl. No.: 916,659

[22] Filed: Jul. 20, 1992

[51] Int. Cl.$^5$ .......................... C08J 11/00; C08J 1/10; C08J 1/12

[52] U.S. Cl. .......................... 524/10; 524/15; 536/69; 536/70; 536/71

[58] Field of Search .......................... 524/10, 15; 536/69, 536/70, 71

[56] References Cited

U.S. PATENT DOCUMENTS

| | | | |
|---|---|---|---|
| 1,463,905 | 8/1923 | Nielsen | 524/10 |
| 1,954,729 | 8/1929 | Dreyfus et al. | 536/69 |
| 1,986,908 | 1/1935 | Yarsley | 536/69 |
| 2,040,801 | 5/1936 | Billing | 536/69 |
| 3,674,894 | 7/1972 | Economy et al. | 536/59 |
| 3,875,088 | 4/1975 | Arons et al. | 524/13 |
| 3,923,726 | 12/1975 | Benz | 525/175 |
| 4,016,030 | 4/1977 | Sobota | 162/359.1 |
| 4,016,353 | 4/1977 | Goheen et al. | 536/58 |

*Primary Examiner*—John Kight, III
*Assistant Examiner*—Jeffrey Culpeper Mullis
*Attorney, Agent, or Firm*—Townsend and Townsend Khourie and Crew

[57] ABSTRACT

A method is provided for preparing a cellulose ester plastic composition from waste paper (e.g. recycled paper) and/or sugar cane bagasse. The paper or bagasse is reacted with an acid anhydride in the presence of a catalyst to esterify some of the hydroxy groups on the cellulose. The resulting cellulose ester product is combined with various additives such as acetins, agricultural fillers, and carbon particles.

25 Claims, 1 Drawing Sheet

SYNTHESIS OF PLASTICS FROM RECYCLED PAPER AND SUGAR CANE

BACKGROUND OF THE INVENTION

The present invention lies in the field of cellulose acetate polymers, blends, and other compositions. In addition, the invention lies in the field of methods for making such compositions.

Cellulose acetate is a widely-used plastic that can exhibit a variety of chemical and physical properties depending upon its chemical structure. For example, by varying the degree of acetyl substitution on the cellulose backbone, the product can range from a low degree of crystallinity to considerable crystallinity. And the degree of substitution also dictates the product's solubility: a completely substituted product (triacetate) dissolves in dichloromethane but not in acetone, while a somewhat less substituted product dissolves in acetone but not in dichloromethane. Further, by substituting propionate or butyrate for acetyl groups, the flexibility and moisture resistance of the polymer can be increased. The presence of sulfate and certain other inorganic substituents on the cellulose backbone causes the cellulose acetate to become less stable (and more biodegradable).

Consistent with its varied properties, cellulose acetate is used in various commercial products such as textile fibers, photographic films, lacquers, sheeting, and bulk structures. Rayon, the widely-used fiber, is high-purity cellulose acetate that has been spun or extruded from an acetone solution. Non-fibrous, cellulose acetate articles may be prepared by injection molding or extrusion. In some cases, cellulose acetate products contain additives such as plasticizers or other plastics.

The properties of the cellulose acetate are dictated by the reaction conditions under which cellulose is reacted with acid anhydride. In conventional processes, cellulose starting material is esterified with acetic anhydride in the presence of a catalyst such as sulfuric acid and a solvent such as acetic acid. In some cases, other solvents such as chloroform or dichloromethane are added to solubilize the cellulose acetate in the early stages of the reaction. If the reaction goes to completion, i.e. nearly all of the free hydroxy groups on the cellulose starting material are esterified, a triacetate will form. Of course, the degree of acetyl substitution will vary with the reaction time, the reaction temperature, and other parameters. Further, water can be added to the reaction mixture to promote hydrolysis of the ester groups during a "ripening period." This typically converts the triacetate into a less acetylated, acetone-soluble form that can be used to spin rayon fibers.

To make cellulose acetate for rayon, a high-purity source of cellulose is required. If impurities are present at even low concentrations, extrusion may become difficult or impossible. Thus, clean, high-grade cotton linters (produced by milling operations) are typically used in commercial processes. Cotton linters contain small diameter fibers which can be rapidly converted to a reactive acid-soluble form.

Unfortunately, cotton linters are not an ideal starting material for all cellulose acetate products. Sometimes waste seeds, milling oils and other contaminants have to be separated from the useful cotton material. And because cotton is usually grown in warmer climates, transportation (as low-density, loose bales) to factories in colder areas adds to the cost of the final product. Further, an increasing percentage of cotton linters have naturally colored fibers as opposed to white fibers; yet white or clear products are often preferred for plastic products.

The high cost of cotton linters (depending on the quality, between $0.18 and $0.22/pound) makes cellulose acetate uneconomical for many applications. In 1992, bulk quantities of cellulose acetate cost about $1.65/pound (excluding transportation costs), a relatively high price in comparison to petroleum and gas derived polymers such as polyethylene, polystyrene, polypropylene and polyvinyl chloride. As a result, cellulose acetate has been displaced by less expensive polyethylene and similar polymers for many applications. Yet, for some of these applications, a high-purity, high-cost cellulose acetate polymer is not needed. For instance, many molded plastic products can be produced from cellulose acetate containing considerable filler or other impurities.

Given the high cost of most commercial cellulose acetate made from cotton linters, it can be seen that an inexpensive source of cellulose acetate is desirable for various applications.

SUMMARY OF THE INVENTION

The present invention provides methods for converting waste paper and sugar cane bagasse into cellulose acetates and filled plastics. Because recycled paper and bagasse are substantially less expensive than linters or wood pulp, the inventive methods provide a relatively inexpensive source of cellulose acetate. Further, the present invention makes use of waste streams that would otherwise be directed to landfills or be put to less economical uses.

In one form, the method of the present invention involves synthesizing a cellulose ester composition from paper or bagasse (both of which contain cellulose) by contacting the cellulose with an acid anhydride in a reaction mixture. Suitable acid anhydrides include acetic anhydride, propanoic anhydride, butyric anhydride or phthalic anhydride. Typically a catalyst (such as sulfuric acid, hydrochloric acid or a combination thereof) will be used to accelerate the conversion o of cellulose to the appropriate cellulose ester. Preferably, the ratio of cellulose to acetic anhydride will be between about 1:1 and about 1:5, and more preferably between about 1:2.5 and about 1:3.5. After the reaction is completed, the cellulose acetate composition is recovered from the reaction mixture.

If paper is used as a source of cellulose, and that paper contains ink, an additional step of removing the ink from the cellulose ester composition will sometimes be desired. The ink can be removed by a variety of processes, including solvent extraction or direct filtration. If the paper contains additional colored dyes or other materials, these may be removed by adding carbon particles to the reaction mixture. The colored material will (depending upon its chemical make-up) preferentially combine with the carbon particles which can be separated from the cellulose ester composition or left in as filler.

Certain preferred compositions of the present invention include between about 50% and about 90% by weight of cellulose ester producible from paper or bagasse and between about 10% and about 50% by weight of underivatized cellulose. More preferably, the compositions will include between about 60% and about 80% by weight of the cellulose ester. In these compositions, the cellulose ester preferably contains between about 0.3% and about 2% substitution with catalytic groups (e.g. bisulfate groups), thus rendering the composition somewhat biodegradable. In some compositions, additives such as plasticizers and fillers will be present. For example, glycerine acetate plasticizers may be present in an amount of between about 4% and about 35% by weight. Fillers (such as a ground nut shell or crustacean shell) will sometimes be present in an amount of between about 1% and about 15% by weight.

DESCRIPTION OF THE PREFERRED EMBODIMENT

Contents

Figure 1:
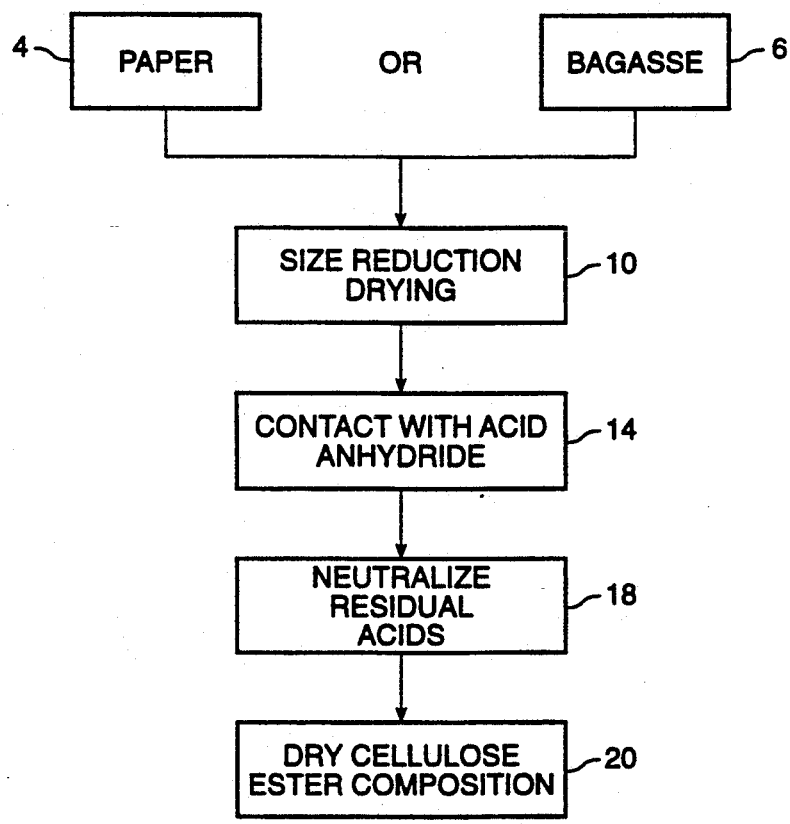
FIG. 1 is a flow chart of a preferred process for converting paper or bagasse to cellulose ester products.

I. Glossary
II. Paper as a Cellulose Resource
III. Sugar Cane as a Cellulose Resource
IV. The Invention Process
V. Examples
VI. Conclusion I. Glossary The following definitions are presented to aid in understanding the present invention. The specific embodiments presented in the definitions are only examples within broader classes and are not intended to limit the meaning of the claims.

Paper: A sheet of cellulose-containing material which is used to display printed matter, clean up debris, wrap various items, etc. For purposes of this invention, preferred papers are previously used or "waste" papers that would otherwise be disposed of or recycled. Examples of waste paper includes newspapers, paper telephone directories, magazines, books, bags, and wrappers for fast foods. In some cases, the paper used with this invention will have been previously recycled. For purposes of this invention, paper will contain wood pulp, cotton or various other cellulosic fibers. It may also contain ink and non-cellulosic materials.

Cellulose Ester: A cellulose derivative in which at least some of the free hydroxy groups have been substituted with ester groups. For purposes of their invention, suitable cellulose esters include cellulose acetate, cellulose propionate, cellulose butyrate, cellulose phthalate and mixed cellulose esters containing combinations of ester groups. The cellulose esters of this invention can contain varying degrees of substitution depending upon the desired application.

Acetylation Agent: A compound or mixture of compounds which contain acetyl groups (CH$_3$C(O)O—) available for addition to another compound such as a hydroxyl containing compound. The reaction of an acetylation agent with a hydroxyl containing compound will under the right conditions sometimes yield an acetate ester.

Underivatized Cellulose: A cellulose that has not been chemically altered from its natural form in any substantial manner. In a particular embodiment of the present invention, underivatized cellulose will have few, if any, naturally occurring hydroxyl groups converted to ester or other groups. In preferred embodiments, underivatized cellulose will be substituted with less than about 20% ester groups, and more preferably, less than about 10% ester groups.

Agricultural Filler: A material added to a polymeric material for purposes of altering the properties of the final material. Agricultural fillers are made from materials commonly obtained by farming or harvesting activities. For example, commonly cultivated plant materials such as nuts, berries, corn, and other grains contain waste materials such as shells or husks which can be used as agricultural fillers. In addition to other natural materials, the shells of mollusks or other seafood can be used as agricultural fillers.

Article: A product that can be made available in commerce. For purposes of this invention, articles are preferably fabricated from cellulose ester containing plastics. Such articles may be prepared by molding, extruding, spinning, coating, calendaring, mixing and other techniques used to process polymers and plastic materials. A few examples of articles contemplated by the present invention include eating utensils, sheeting, casings (ornamental and/or functional for appliances and electronic components), furniture, rope, etc.

Biodegradable: Although no generally accepted definition of "biodegradable" exists in the art, for purposes of this application, it refers to a material that decomposes period of less than about 10–15 years to primarily carbon dioxide and water or minerals commonly found in the environment. Preferably the material will completely decompose in less than about 5 years when buried in soil containing natural microorganisms.

II. Paper As A Cellulose Resource

In most industrial countries, the number of landfills available for dumping solid refuse is declining. For example, in the United States, the Environmental Protection Agency (EPA) predicts that by the year 2000 the number of landfills in operation will be half of the number in operation in 1990. Published studies by the EPA and other agencies also indicate that waste paper accounts for about 40% by weight of the landfill composition. No other waste stream compares with paper in this regard.

Many major cities in industrial countries have recycling programs for paper. Much of this recycling effort concentrates on newspapers which are easily separated from the bulk of the waste stream. The cost of recycled newspaper remains quite low (it was about $0.01/pound in 1992). In some cases, waste facilities have even paid commercial operations to remove the paper waste.

Recycling operations now typically use the waste paper to make other paper products. As the number of recycling cycles increases, the length of individual cellulose fibers decreases, such that, in most cases, fresh cellulose pulp must be added into paper products to maintain a reasonable tensile strength. Thus, it is difficult to profitably convert recycled paper into paper end products (i.e. products that could be sold for between about $0.15 and $0.35 per pound). As a result, an economical recycling operation requires a very large plant. In contrast, a high value cellulose product, such as the cellulose ester products of the present invention, can be produced at smaller plants near the source of the waste paper (thus reducing transportation costs).

II. Sugar Cane As A Cellulose Resource

Sugar cane is a perennial grass of the genus Saccharum, which grows in tropical and subtropical regions throughout the world, including Louisiana, Florida and Hawaii in the United States. The bagasse (residue from sugar milling operations) typically amounts to about 20% to 30% of the cane processed. It consists of woody fibers—similar to wood pulp—and juices containing unextracted sugar. The percentage of water varies depending on the method of processing but typically ranges between 20% to 40%. In many mills, the bagasse (and sometimes waste leaves) is used as a fuel source, being burned in boilers which can deliver surplus electrical power to the grid. Other uses for bagasse have also been explored. For example, in several parts of the world, the bagasse fiber is used as a substitute for wood pulp in paper. Still other applications have included bagasse-based tiles, wallboard, insulating board and plant mulch. Unfortunately, the capital expenses required for some of these processes makes the production of a low cost end product difficult, except when large milling operations or combinations of several mills use a single manufacturing plant to convert the bagasse. Because bagasse is available worldwide in quantities exceeding 50 billion pounds per year, it represents a potentially vast source of cellulose for the plastic compositions of the present invention.

IV. The Cellulose Ester Synthesis Process

The present invention provides various methods for making plastics from paper and bagasse. The plastics prepared according to this invention can have a wide range of properties depending upon how they are blended with other plastics and how they are combined with fillers or plasticizers. Further, the properties can be tailored by leaving some underivatized cellulose or ink in the final plastic product. And, of course, the properties can be controlled by varying the reaction conditions. For example, if mild hydrolysis conditions are employed, some sulfate (or other catalyst group) will remain on the cellulose ester, yielding a desirable biodegradable product.

Referring now to FIG. 1, the first step in the conversion of recycled paper 4 and bagasse 6 into cellulose polymers of the present invention is size reduction 10. Generally, smaller particle sizes result in faster, more uniform reaction rates, while larger particle sizes result in slower reaction rates. If the particles are too large, mixing becomes more difficult and, in some cases, complete and uniform conversion of the cellulose materials is prevented.

If the feed stock is paper, size reduction is accomplished by shredding the paper sheets into small particles. This can be accomplished with a variety of apparatuses. For example, large scale commercial shredders can be used to reduce the bulk paper into long thin sections. These can then be fed to cross shredders to reduce the paper into small rectangles. The particle sizes can thus vary considerably depending upon the processing equipment employed. As the particle size gets smaller, the feed rates for size reduction go down and the equipment cost goes up. Preferred average paper particle sizes range from about 1 mm to about 25 mm, more preferably between about 1.5 mm and about 20 mm, and most preferably between about 2 mm and about 15 mm.

For bagasse, commercial hammer mills can be used to reduce particle size. Of course, a variety of other size reduction apparatuses and methods can also be used. If the bagasse has a high water content, it may require partial drying in belt dryers, rotary ovens or similar commercial equipment before milling to a small particle size (e.g., −10 mesh). Preferred bagasse particle sizes are between about 10 mesh and about 150 mesh, more preferably between about 20 mesh and about 100 mesh, and most preferably between about 50 mesh and about 80 mesh.

The present invention may be employed to synthesize compositions containing a variety of cellulose esters. The overall chemical reaction for synthesizing cellulose esters involves reacting cellulose with an acid anhydride to make the desired cellulose ester and an acid by-product. The stoichiometric equation for preparing cellulose triacetate is expressed by following equation:

The well-known principles and apparatuses conventionally used to prepare cellulose esters may be employed in the present invention unless otherwise noted. Generally, paper or bagasse particles prepared as described above are contacted (shown at 14 in FIG. 1) with one or more acid anhydrides in the presence of a solvent (e.g. acetic acid) and a catalyst to form the cellulose ester of interest. The reacting anhydrides are converted to the corresponding carboxylic acids which can then be recycled with solvent or sold to recover the costs of the anhydride. Alternatively, the acid can be converted to anhydride through various vapor phase reactions known in the art. Process parameters that may be controlled include reaction temperature, reaction time, the ratio of anhydrides to paper or bagasse, and the ratio of catalyst to starting dried cellulose materials.

The reactions of acetic, butyric, propionic, and other anhydrides with cellulose, are exothermic. Thus, when a source of small fiber cellulose such as cotton is employed, the reaction temperature can sometimes be difficult to control. Therefore, reaction mixtures are often chilled before adding the cotton fibers. Still, the temperature of the conventional reaction mixtures can rise to 35 degrees Centigrade or higher within an hour after the cotton fibers are added, even when standard cooling techniques (e.g. brine cooling) are employed. Without cooling, the reaction mixture may get hot enough to damage the cellulose and cellulose acetate, thus degrading the final product. However, if the reaction mixture is cooled too quickly, the acids in the reaction mixture crystallize, causing a sudden stop to the reaction. If this occurs, the mixture must be carefully heated to restart the reaction.

By controlling the particle size of paper or bagasse fed into the reaction mixture and by controlling the rate of addition, it is possible to completely eliminate the need for expensive chilling equipment. It has been found that if some temperature control is required for bagasse or paper reactions, simple recirculation of chilled water in the reactor jacket can maintain uniform temperatures. The rate at which cellulose materials break down and then react with the anhydrides proceeds at a sufficiently slow rate that reaction temperatures can be maintained to within several degrees without cooling.

When cotton linters are converted into cellulose acetate, some acetic acid is added to the reaction mixture to wet the cellulose fibers and to maintain the solubility of the cellulose acetate formed in the reaction. For recycled paper and bagasse, a solvent is also necessary. However, it has been found that paper and bagasse fibers tend to act as sponges, absorbing much of the liquid. Thus, in order to maintain a liquid reaction medium, additional amounts of acetic acid or other liquid solvent (above that required with cotton linters) may be required. Of course, the actual amount of solvent will vary somewhat depending upon the feed stock composition employed.

The amount of acetic anhydride actually required is also greater than the amount theoretically required. Of course, by using less acetic anhydride, the degree of acetal substitution on the final product will be reduced.

The properties of the plastic cellulose product can be altered by using other acid anhydrides, alone or in combination, as substitutes for acetic anhydride. For example, phthalic, butyric or propionic anhydride can be added to form other cellulose plastics to make cellulose phthalate, cellulose butyrate, or cellulose propionate, respectively. Because acetic anhydride is the least expensive reactant among this group, it is preferred for most applications. Of course, if other esters have desirable properties for a particular application, cost may not dictate which reactants are employed.

For purposes of this invention, preferred cellulose esters are substituted with between about 20% and about 55% acetyl (or other ester) groups, more preferably between about 35% and about 55%, and most preferably between about 40% and about 55%.

Sulfuric acid is a common acid catalyst used in cellulose acetate production. Other acids have also been used but generally are more expensive to use than sulfuric acid. Thus, for recycled paper and bagasse feedstocks, concentrated sulfuric acid is often a preferred catalyst. However, hydrochloric acid is sometimes preferred because it can be used to soften or break down the structure of paper to allow easier processing. Combinations of hydrochloric and sulfuric acids may be used in the methods of this invention. Other catalysts that may be employed include (alone or in combination with other catalysts) zinc chloride, perchloric acid (a very active catalyst that must handled carefully to avoid explosion), methanesulfonic acid, methane disulfonic acid, sulfoacetic acid, aniline perchlorate, sulfamic acid, ammonium sulfamate, hydroxylamine, and orthotitanic acid.

In the reaction to form cellulose acetate, the sulfuric acid or other catalyst first derivatizes the cellulose to form a sulfates or other esters. Subsequently, the sulfates are displaced by acetyl groups from the acetic anhydride. In the case of recycled paper and bagasse feed stocks, the sulfuric and/or hydrochloric acids are not completely displaced during the reaction. In other words, some of the bisulfate or chloride groups remain attached to the cellulose ester products. In most commercial cellulose acetate syntheses, such residual catalytic groups are removed from the product by hydrolysis. However, because these groups can help accelerate biodegradation, they can be left on the final cellulose esters produced according to the present invention. The weight percent of the catalyst in the final product is in part controlled by the methods of hydrolyzing, washing and neutralizing the acetates. For purposes of this invention, the amount of catalytic groups in the final dried neutralized plastic material, preferably ranges between about 0.1% and about 2.5% by weight, more preferably between about 0.2 and about 2.1% by weight, and most preferably between about 0.7 and about 1.9% weight percent.

For each kilogram of cotton linters used in commercial syntheses, 0.02 to 0.10 kilograms of sulfuric acid, and 2 to 3.5 kilograms of acetic anhydride are typically employed. In the present invention, for each kilogram of dry paper used, about 3 to 10 kilograms acetic acid, about 2 to 4 kilograms acetic anhydride, and about 0.02 to 0.10 kilograms sulfuric acid are required. More preferably, for each kilogram of paper, between about 2.5 and about 3.5 kilograms of acetic anhydride, between about 6 and about 9 kilograms of acetic acid, and between about 0.05 and about 0.09 kilograms sulfuric acid are employed. Also, in this invention, for each kilogram of dried milled bagasse powder used, about 2 to 4 kilograms acetic acid, about 2 to 4 kilograms acetic anhydride, and about 0.02 to 0.10 kilograms sulfuric acid are required. More preferably, for each kilogram of dried bagasse, between about 2.5 and about 3.5 kilograms acetic acid, between about 2.0 and about 3.0 kilograms acetic anhydride, and between about 0.05 and about 0.09 kilograms sulfuric acid are employed.

Recovery of the cellulose ester product can be accomplished by conventional methods, and the choice of techniques is not critical. Suitable methods include precipitation, filtering, and washing. In addition, the residual acids must generally be neutralized (shown at block 18 in FIG. 1) and the product dried (shown at 20). Neutralization can be accomplished with a basic aqueous solution such as a 20% ammonium hydroxide solution. Drying can be done in ovens, belt driers, rotary driers or other means commonly used in the industry. Acetone or other solvents can be removed using vacuum distillation to concentrate the plastic solution for immediate use or later precipitation. In some cases, it may be necessary to mill the final plastic material to obtain a fine powder suitable for use by the manufacturers of the desired plastic articles. In general, the cellulose polymers of the present invention can be provided in a particle size that is smaller than a 20 mesh screen, and preferably between about 50 and about 100 mesh.

Most paper feedstocks contain black and/or colored inks. Black inks typically contain small particles and carbon black. Colored inks contain a variety of components, including organic dyes and synthetic compounds. Some of these are water soluble, others are soluble in nonpolar solvents. Because waste paper generally includes inks and other materials, in addition to cellulose, it is sometimes desirable to separate the inks from the products or reactants. Of course, the unreacted materials and inks can be left in the final product as a filler to produce a cellulose acetate plastic which has a brown (lower reaction temperatures) to gray (higher reaction temperatures) appearance. Another option is to separate the cellulose acetates from this mixture using solvent extraction. Alternatively, the final reaction mixture can be filtered or pressed to remove unreacted materials and inks. This filtered or pressed viscous liquid can then be further purified using activated carbon granules.

If water is directly added to the reaction mixture at the end of the designated reaction period, the cellulose acetates will precipitate. This leaves the inks and other solids in the form of a gel which can be filtered from the acetic and sulfuric acid mixture to produce clear (lower reaction temperatures) to yellow (higher reaction temperatures) product that is free of carbon black. The filter cake is then washed and neutralized to remove excess acids. The final product is subsequently dried to produce a product that can be molded or extruded like many other plastics. The yield of this material from paper is typically about 145% to 155% on a dry weight basis. The weight gain results from the acetyl and catalytic group substitution on the free cellulose. Often, substantial amounts of underivatized cellulose will be present in the isolated composition, preferably in an amount of less than about 60% by weight, and more preferably, between about 10 and about 50% by weight.

In a different process, the inks and unreacted materials can be isolated from the acetates by extraction with a mixture of acetone and chloroform or other solvents. This permits the unreacted materials to be separated by filtration of the solvent soluble acetates, followed, if necessary, by purification with carbon granules or other methods. Although solvent extraction produces cellulose polymers having suitable properties, it is relatively expensive and results in lower yields of polymers. Therefore, direct filtration or pressing of the final reaction mixture is generally preferred.

Additional colored materials can often be removed from the product mixture with carbon particles. The particles contacted with the reaction mixture for a period of time ranging from seconds to minutes to selectively absorb the colored materials. Direct filtration will remove the spent carbon particles, which preferably range in size from about 8 to 30 mesh. This carbon granule waste stream can then be added as a filler to some cellulose acetate blends to produce a black article. For example, sheets used to cover agricultural fields are preferably black to maintain warmer soil temperatures for crop growth.

Bagasse derived plastics can, of course, be produced without the need to remove inks and solvents commonly found in waste paper. Like paper based plastics, all unreacted materials in the bagasse reaction mixture can be left in the final plastic product or can be separated beforehand. If underivatized cellulose or other material is to be left in the product, milling prior to, as well as after, the final reactions and drying steps may be necessary.

The viscosity of cellulose acetate plastics produced according to the present invention will sometimes vary slightly from batch to batch. This can be the result of small changes in the process parameters, including differences in the raw material composition, reaction temperature, and other factors. Cellulose esters produced according to this invention can be stored in batches and then blended to obtain a more uniform end product, if necessary. Alternatively, batches having slightly higher or lower viscosities than normal may be selected for product applications requiring a specified viscosity.

Cellulose acetate or filled cellulose acetates made from recycled paper or bagasse are compatible with various plasticizers and fillers. Preferred plasticizers and fillers are agriculturally based products that are environmentally benign. A particularly preferred class of plasticizers is the glycerine acetates (acetins). Preferably, acetin plasticizers are added in amount of between about 1% and about 35%, and more preferably between about 5% and about 20% by weight of the plastic product. Other plasticizers that are compatible with cellulose acetate include dimethyl phthalate, diethyl phthalate, dibutyl phthalate, and triphenyl phosphate. The concentrations and types of plasticizers employed can be used to control for example the flow temperature required to produce a specific article.

A variety of fillers can be added to the polymers of the present invention to impart color, fragrance, strength, biodegradability etc. to the final product. Particularly preferred fillers include materials derived from agricultural products. Suitable fillers include powders or flours made from waste nut shells including walnut, pistachio, peanut, and almonds and waste crustacean shells including lobster, shrimp and crab. These fillers can be present in an amount of between about 1% and about 15%, and more preferably between about 2% and about 5% by weight of the final plastic product. Other fillers include calcium carbonate in a loading of between about 0.5 and about 5 weight percent. Preferred sizes for calcium carbonate filler particles range from about 0.5 microns to about 50 microns.

In some cases, other materials can be added to the cellulose acetate to alter its physical and optical properties. For example, in the case of plastic articles which are exposed to intense light (e.g. some plastics used for agricultural purposes), photoinhibitors may be blended into the final plastic. Generally, compounds that absorb ultraviolet radiation and then dissipate the energy in a form that does not damage the polymer can serve to stabilize the product against photodegradation. Effective ultraviolet inhibitors include selected resorcinol and benzophenone derivatives such as resorcinol dibenzoate and 2-hydroxy-4-methoxybenzophenone.

V. Examples

1. Cellulose Acetate Blends From Newspaper

A. Recycled newspaper was shredded using a commercial cross shredder to achieve a particle size of one-eighth of an inch by one-half inch and then oven dried at 82 degrees Centigrade for 24 hours.

B. Into a 1000 ml glass reactor, the following ingredients were added: 600 cc of acetic acid, 250 cc of acetic anhydride and 6 grams of concentrated (98%) sulfuric acid. The mixture remained at a room temperature (about 20 degrees Centigrade).

C. Into the above reaction mixture, 20 grams of shredded newspaper was added at time zero. The reaction mixture was continuously stirred during this and subsequent newspaper charges.

D. 30 minutes later, another 10 grams of paper was added.

E. 1 hour after time zero, another 10 grams of paper was added.

F. 1½ hours after time zero, another 10 grams of paper was added.

G. 2 hours after time zero, another 10 grams of paper was added.

H. The resulting viscous reaction mixture was continually stirred for 8 hours.

I. 1800 cc of water was then added to precipitate the cellulose acetate.

J. The resultant slurry was filtered and the filter cake was washed with 100 cc of water.

K. The filter cake was added to 1800 cc water and stirred to produce a thick slurry.

L. To neutralize residual acids, 300 cc of 20% ammonium hydroxide solution was added until the pH 7-8 was reached.

M. The slurry was again filtered and the filter cake washed twice with 100 cc of water at 20 degrees Centigrade.

N. The resultant filter cake was dried in an oven at 82 degrees Centigrade for 24 hours and weighed. The final weight of the brown dry solid was 92 grams. Thus, a yield of 153% was obtained from the recycled paper.

O. The solid cake was then milled to a brown powder. After milling, further drying, and sizing through a 50 mesh screen, the yield was 89 grams or about 148% using the original dried newspaper weight as the basis for yield.

P. The powder from "O" above was pressed into a disk using four grams of dried powder at a pressure of 20,000 psi and a temperature of 150 degrees Centigrade.

The resulting one inch diameter disk (thickness ⅛") was dark and hard, and had a Durometer of 87 and a softening point of 195 degrees Centigrade. The durometer method used herein is based upon ASTM Standard 02240. Using a standard displacement curve, the Durometer reading can be divided by 10 to obtain the load in pounds. All measurements were taken with a plastic specimen of between 18 and 24 degrees Centigrade.

2. Cellulose Acetate & Biodegradable Plasticizers

A. The dried filled cellulose acetate obtained from #1 above was mixed with triacetin. Specifically, 9 parts of filled cellulose acetate from #1, step "O", were mixed with 1 part of triacetin. The resulting blend had a softening point of 165 degrees Centigrade and a Durometer of 58.

B. The dried filled cellulose acetate obtained from #1 above was mixed with monoacetin. Specifically, 9 parts of filled cellulose acetate from #1, step "O", were mixed with 1 part of monoacetin. The resulting blend had a softening point 182 degrees Centigrade and a Durometer of 60.

3. Cellulose Acetate & Biodegradable Agricultural Fillers

A. The cellulose acetate obtained from #1 above was mixed with a powder made from waste nut shells. 8 parts of filled cellulose acetate from #1, step "O" were mixed with 1 part of almond shell powder and 1 part of monoacetin. The resulting blend had a softening point of 188 degrees Centigrade and a Durometer of 67.

B. The cellulose acetate obtained from #1 above was mixed with a powder made from waste nut shells. 8 parts of filled cellulose acetate from #1, step "O" were mixed with 1 part of walnut shell powder and 1 part of triacetin. The resulting blend had a softening point of 183 degrees Centigrade and a Durometer of 70.

4. Cellulose Acetate & Crustacean Shell Fillers

A. The cellulose acetate obtained from #1 above was mixed with a powder made from waste crustacean shells. 8 parts of filled cellulose acetate from #1, step "O" were mixed with 1 part of shrimp shell powder and 1 part of monoacetin. The resulting blend had a softening point 180 degrees Centigrade and a Durometer of 67.

B. The cellulose acetate obtained from #1 above was mixed with a powder made from waste crustacean shells. 8 parts of filled cellulose acetate from #1, step "O" were mixed with 1 part of lobster shell powder and 1 part of triacetin. The resulting blend had a softening point of 184 degrees Centigrade and a Durometer of 65.

5. Cellulose Acetate Blends From Bagasse

A. Bagasse was milled using a blender and micro mill to achieve a particle size of −50 mesh. The powder was then oven dried at 82 degrees Centigrade for 24 hours.

B. Into a 1000 ml glass reactor the following ingredients were added: 240 cc of acetic acid, 120 cc of acetic anhydride and 4 grams of concentrated (98%) sulfuric acid. The mixture was held at room temperature (about 20 degrees Centigrade).

C. Into the above reaction mixture, 33 grams of bagasse powder was added at time zero. The reaction mixture was continuously stirred during this and the next bagasse charge.

D. At a time of 30 minutes, another 33 grams of bagasse was added.

E. The viscous reaction mixture was continually stirred for 8 hours.

F. 900 cc of water was added to precipitate the cellulose acetate.

G. The resultant slurry which formed large particles was filtered through a 50 mesh screen. The filter cake was washed with 200 cc of water.

H. The filter cake was added to 900 cc water and stirred in a high speed blender to produce a slurry and to break up larger particles.

I. To neutralize residual acids 140 cc of 20% ammonium hydroxide solution was added until pH 7–8 was reached.

J. The slurry was filtered using a polypropylene filter and the filter cake was washed twice with 200 cc of water.

K. The resultant filter cake was dried in an oven at 80 degrees Centigrade for 24 hours and weighed. The weight of the brown solid was 129 grams.

L. This material was then milled to a −50 mesh particle size and further oven dried for 24 hours at 85 degrees Centigrade. The weight of the brown solid was 92 grams, a yield of 139% from the bagasse powder.

M. The dried cake was then milled to a −50 mesh brown powder and oven dried for 24 hours at 80 degrees Centigrade. The final yield by dry weight was 88 grams, a yield of 133% from the bagasse powder.

N. The powder from "M" above was pressed into a disk using four grams of dried powder at a pressure of 20,000 psi and a temperature of 150 degrees Centigrade. The resulting one inch diameter disk (thickness ⅛") was dark and hard with a Durometer of 88 and a softening point of 198 degrees Centigrade.

VI. Conclusion

The above description is illustrative only. Many variations of the invention will become apparent to those of skill in the art upon review of the disclosure. Thus, the scope of the invention should be determined not with reference to the above description but instead with reference to the appended claims along with their full scope of equivalence.

What is claimed is:

1. A method of synthesizing a cellulose ester composition from paper, said method comprising the following steps:
   (a) contacting said paper with an acid anhydride in a reaction mixture to convert cellulose in said paper to a cellulose ester;
   (b) recovering said cellulose ester composition from said reaction mixture; and
   (c) separating ink from the cellulose ester by a process selected from the group consisting of filtration and solvent extraction.

2. The method recited in claim 1 wherein said acid anhydride is selected from the group consisting of acetic anhydride, propanoic anhydride, butyric anhydride, phthalic anhydride, and combinations thereof.

3. The method recited in claim 2 wherein the acid anhydride is acetic anhydride, and wherein the ratio of paper to acetic anhydride is between about 1:1 and about 1:5.

4. The method recited in claim 1 wherein said step of contacting includes steps of digesting said cellulose in an aqueous solution of acid anhydride and of agitating the reaction mixture.

5. The method recited in claim 1 wherein said step of recovering the cellulose ester composition includes steps of precipitating the cellulose ester and filtering said precipitated cellulose ester composition.

6. The method recited in claim 5 wherein said step of precipitating includes adding to the reaction mixture a solvent in which the cellulose ester composition is insoluble.

7. The method recited in claim 1 wherein the reaction mixture includes a catalyst selected from a group consisting of sulfuric acid, hydrochloric acid and combinations thereof.

8. The method recited in claim 7 wherein the cellulose in the paper is reacted at a temperature of between about 15 and about 30 degrees Centigrade over a period of between about 3 to about 12 hours.

9. The method recited in claim 1 wherein the paper includes ink, and wherein the step of separating ink is filtration and the method further comprises a step of contacting the cellulose acetate with carbon particles.

10. A method of synthesizing a cellulose ester composition from sugar cane bagasse, said method comprising the following steps:
  (a) reducing the bagasse to particles having an average size of between about 10 mesh and about 150 mesh;
  (b) contacting said bagasse with an acid anhydride in a reaction mixture to convert cellulose in said bagasse to a cellulose ester;
  (c) recovering said cellulose ester from said reaction mixture; and
  (d) admixing a crustacean shell filler with said cellulose ester to form the cellulose ester composition.

11. The method recited in claim 10 wherein said acid anhydride is selected from the group consisting of acetic anhydride, propanoic anhydride, butyric anhydride, phthalic anhydride, and combinations thereof.

12. The method recited in claim 10 wherein said step of contacting includes steps of digesting said cellulose in an aqueous solution of acid anhydride and of agitating the reaction mixture.

13. The method recited in claim 10 wherein said step of recovering the cellulose ester composition includes steps of precipitating the cellulose ester and filtering said precipitated cellulose ester composition.

14. The method recited in claim 10 wherein the reaction mixture includes a catalyst selected from a group consisting of sulfuric acid, hydrochloric acid and combinations thereof.

15. The method recited in claim 10 further comprising a step of reducing the bagasse to particles having an average size of between about 20 mesh and about 100 mesh.

16. A method of synthesizing a cellulose acetate composition, said method including the following steps:
  (a) contacting cellulose from a material selected from the group consisting of paper and bagasse with an acetylation agent in the presence of a catalyst;
  (b) recovering a biodegradable product containing cellulose acetate having between about 0.1% and about 2.5% substitution with catalytic groups; and
  (c) admixing a crustacean shell filler with the cellulose acetate to from the cellulose acetate composition.

17. The method recited in claim 16 wherein said step of contacting includes steps of digesting said cellulose in an aqueous solution of acid anhydride and of agitating the reaction mixture.

18. The method recited in claim 16 wherein said step of recovering the cellulose ester composition includes steps of precipitating the cellulose ester and filtering said precipitated cellulose ester composition.

19. The method recited in claim 16 wherein the cellulose is reacted with the acetylation agent at a temperature of between about 15 and about 30 degrees centigrade.

20. A method of synthesizing a cellulose acetate composition, said method including the following steps:
  (a) contacting cellulose from a material selected from the group consisting of paper and bagasse with acetic anhydride in an amount of between about 2.0 and about 4.0 kilograms per kilogram of paper or bagasse;
  (b) recovering cellulose acetate;
  (c) admixing a crustacean shell filler with the cellulose acetate to form the cellulose acetate composition; and
  (d) preparing an article from the product of step (c).

21. A cellulose ester composition comprising:
  (a) between about 50% and about 90% by weight of a cellulose ester producible by derivatizing cellulose from a source selected from the group consisting of paper and bagasse, said cellulose ester containing between about 0.3% and about 2% substitution with bisulfate or chloride groups;
  (b) between about 10% and about 50% by weight of underivatized cellulose; and
  (c) between about 1 and 15% by weight crustacean shell filler.

22. The composition of claim 21 wherein said cellulose ester is a cellulose acetate having between about 20% and about 55% substituted acetate groups.

23. The composition of claim 21, further comprising a glycerine acetate selected from the group consisting of monoacetin, diacetin and triacetin wherein the glycerin acetate is blended with the plastic in a weight percent loading ranging from about 4% to about 35%.

24. The composition of claim 21, wherein the crustacean shell filler is selected from the group consisting of powders of lobster, shrimp or crab shells.

25. The composition of claim 21, further comprising calcium carbonate powder present in a weight percent loading ranging between about 0.5% and about 5%, and wherein the calcium carbonate powder includes particles ranging in size from about 0.5 microns to 50 microns.

* * * * *